United States Patent [19]
Aisaka

[11] Patent Number: 5,987,133
[45] Date of Patent: Nov. 16, 1999

[54] ELECTRONIC AUTHENTICATION SYSTEM

[75] Inventor: Kazuo Aisaka, Tokyo, Japan

[73] Assignee: Digital Vision Laboraties Corporation, Tokyo, Japan

[21] Appl. No.: 08/802,754

[22] Filed: Feb. 20, 1997

[30] Foreign Application Priority Data

Feb. 23, 1996 [JP] Japan ..................................... 8-036658

[51] Int. Cl.⁶ ............................... H04L 9/32; H04L 9/30; H04L 9/00
[52] U.S. Cl. .................................. 380/25; 380/9; 380/23; 380/30; 380/49
[58] Field of Search .................... 380/9, 23, 25, 380/30, 49, 50

[56] References Cited

U.S. PATENT DOCUMENTS

| | | |
|---|---|---|
| 4,868,877 | 9/1989 | Fischer . |
| 4,893,338 | 1/1990 | Pastor ......................................... 380/25 |
| 5,016,274 | 5/1991 | Micali et al. .............................. 380/23 |
| 5,506,905 | 4/1996 | Markowski et al. . |
| 5,537,475 | 7/1996 | Micali ........................................ 380/30 |

*Primary Examiner*—Bernarr E. Gregory
*Attorney, Agent, or Firm*—Christensen O'Connor Johnson & Kindness PLLC

[57] ABSTRACT

As a public key, a character string which can be easily reasoned by a person, e.g., a character string obtained by adding a specific character string, e.g., "?", of which code is an odd number to the end of a name, is used. A signature given to a document to be sent is encrypted by using a secret key generated from the public key, and the encrypted signature is sent together with a plaintext document. On the reception side, the encrypted signature is decrypted by using a public key obtained by adding a character string, "?" in this case, whose code is an odd number to the end of the name of the sender. The decrypted signature is compared with a signature included in the plaintext document, so that authentication can be performed. Since the public key need not be stored in an electronic dictionary file or the like, illegal authentication is not easily established by falsifying the public key in the electronic dictionary file.

24 Claims, 4 Drawing Sheets

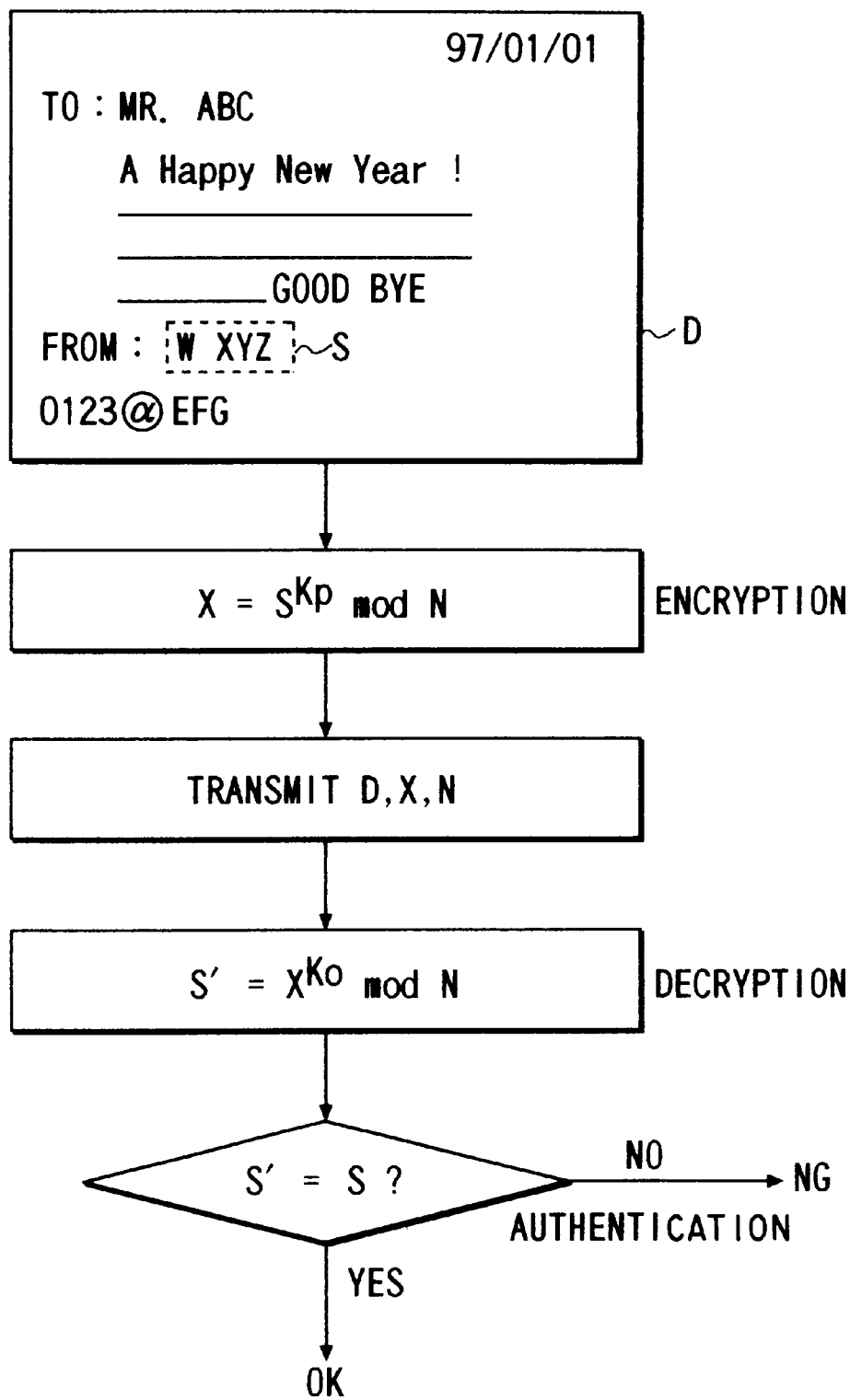
F I G. 1

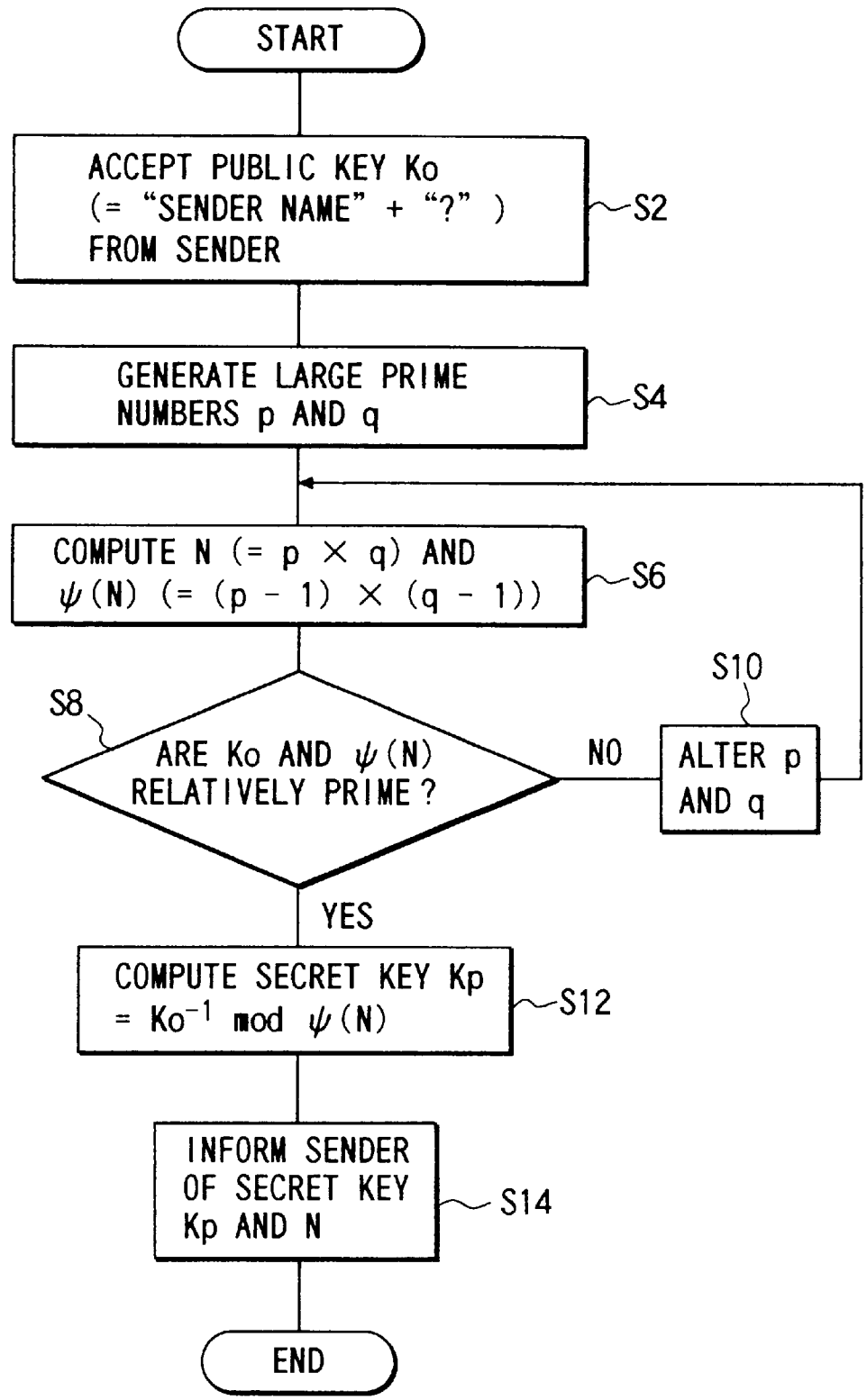
F I G. 3

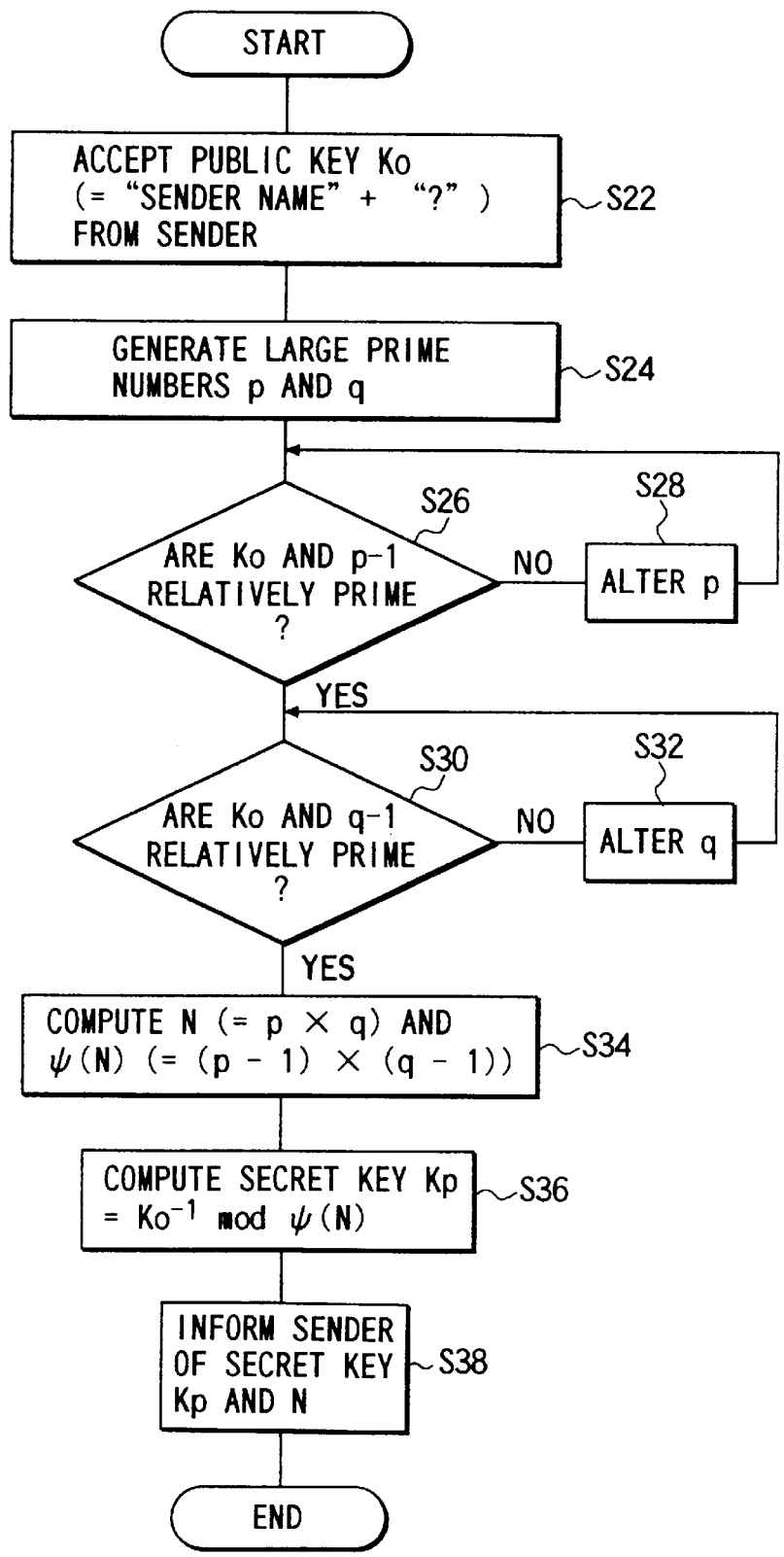
F I G. 4

ELECTRONIC AUTHENTICATION SYSTEM

BACKGROUND OF THE INVENTION

The present invention relates to an electronic authentication system for giving a digital signature to data by using a cryptography technique.

In recent years, with developing of a computer network such as Internet or the like, a demand for electrically paying cash on a network becomes strong, and so-called electronic cash or digital cash is developed. In this case, a financial institution or a user gives a digital signature to value data showing an amount of money to send data to a third party, and the third party ascertains the validity of the digital signature to determine whether the value data is genuine. By the above electronic authentication, electronic payment can be performed.

This electronic authentication uses a cryptography technique to prevent a third party from stealing or counterfeiting communication data. As general cryptography schemes, a common-key cryptography scheme or a secret-key cryptographic scheme (hereinafter called a common-key cryptography scheme) and a public-key cryptographic scheme are known.

In the common-key cryptography scheme, a key used for encryption of data (plaintext) is the same as a key used for decryption (return to plaintext) of a ciphertext. Therefore, in the common-key cryptography scheme, a ciphertext can be communicated exclusively among specific persons who know the key. When a person sends a ciphertext to a third party, the third party must know the key of the person in advance. In this case, the key means a unique bit string having a proper length and assigned to each person. Since a person inconveniently memorizes or inputs the bit string itself, a character string represented by an ASCII code or the like may be assigned to the person as a key, the ASCII code will be converted into a bit string corresponding to the character string in a processing apparatus, and the bit string may be used for encryption or decryption.

On the other hand, in the public-key cryptographic scheme, a key for encryption is different from a key for decryption. One is disclosed, to be referred to as a "public key" or an "open key" hereinafter, and the other is secret, to be referred to as a "secret key". The secret key and the public key are set to satisfy a predetermined mathematical rule. In general, one of the secret key and the public key is determined first, and the other is formed according to this rule. Only a person in question is secretly informed of the secret key, and the others are not informed of the secret key. The public key is electrically stored in a dictionary file of a system. A third party can know the public key. As a matter of course, a generation process of these keys is systematically secret, and outsiders cannot know the generation process.

Encryption in the public-key cryptographic scheme is performed when a third party communicates with a person. When the third party wants to encrypt a communication text, the third party searches a dictionary file for the public key of the person and encrypts the communication text by using the searched public key to sends the ciphertext. On the reception side, the receiver decrypts the ciphertext by using his/her secret key. In this manner, a person who does not know the secret key cannot decode the encrypted communication text (ciphertext), and communication from a third party to the person is kept secret. According to the public-key scheme as described above, the third party encrypts a communication text by using a public key of a person at a communication destination. Therefore, the person can receive communication data from an unspecified number of persons in secret.

When the cryptography technique using the public-key cryptographic scheme is used, electronic authentication may be performed as follows. Electronic authentication is performed when a certain person sends data to a third party. Unlike cryptographic communication, the certain person encrypts signature data by using his/her secret key. Document data with signature (plaintext) and encrypted signature data are sent to the third party. The third party decrypts the encrypted signature data by using a public key of the certain person and compares the sent signature data (plaintext) with the decrypted signature data to determine whether the signature data is genuine (electronic authentication).

As the decryption using the public-key cryptographic scheme, an RSA scheme (Rivest-Shamir-Adleman scheme) is mainly used. The principle of the RSA scheme uses a power calculation and a modulo (mod) calculation in which a remainder of division is computed. More specifically, in encryption, a remainder Y of the plaintext X powered by Ko ($X^{Ko}$) the divisor N is computed. In this case, Ko (and N) is a public key, and Y is a ciphertext. In decryption, a remainder of Y powered by Kp ($Y^{Kp}$) by the disivor N is computed. This remainder coincides with the original plaintext X. Therefore, Kp serves as a secret key. The public keys of all persons are electronically stored in a dictionary file or the like such that anybody can freely search for the public keys. Each public key can be read by using a name or an ID number of the person.

In the RSA scheme, since a public key and a secret key have the same mathematical property, when the public key and the secret key are used in a reversed order, the electronic authentication described above can be performed.

Since anybody can access an electronic dictionary file in which the public key is stored, a security problem is posed. More specifically, when the electronic dictionary file is counterfeited or falsified by a malicious hacker, a third party can illegally give signature data onto communication data by using a pair of false secret key and false public key to establish authentication. In the RSA scheme, it is assumed that Kp, N, and Ko which satisfy the above relationship exist, and that Ko cannot be computed on the basis of N and Kp. However, if both the secret key and the public key are set to +1 (or −1), the above relationship is satisfied. Therefore, when the public key is set to +1 (or −1) by falsifying the electronic dictionary file, authentication is established by illegally encrypting signature data by using a false secret key (+1 (or −1)).

This false authentication may be also established in a communication system using the public-key cryptographic scheme.

As described above, in conventional cryptography using a public-key cryptographic scheme, a dictionary file in which a public key is electronically stored may be falsified. Therefore, encryption or decryption may be illegally performed, and illegal authentication may be established.

BRIEF SUMMARY OF THE INVENTION

Accordingly, it is an object of the present invention to provide an electronic authentication system which can prevent illegal authentication from being established.

According to the present invention, there is provided an electronic authentication system in which signature data in communication data is encrypted by using a secret key of a sender in an RSA scheme, the encrypted signature data is sent together with the communication data, a third party decrypts the encrypted signature data by using public key of the sender, and genuineness of the decrypted signature data is determined to assert the validity of the signature, in which the public key is a character string obtained by adding a character or a character string whose code is an odd number to the end of a character string which can specify a sender.

Here, the public key is a character string obtained by adding a character or a character string whose code is an odd number to the end of a character string including at least one of the name, address, and E-mail address of the sender.

The secret key is computed from the public key on the basis of the relationship represented by the following equation:

$$(Ko \times Kp) \bmod((p-1) \times (q-1) \div \gcd(p-1, q-1)) = 1$$

where, Ko is a public key, Kp is a secret key, p and q are large prime numbers, mod is modulo operation, gcd is a greatest common divisor, and p and q are set such that Ko and $(p-1) \times (q-1)$ are relatively prime.

According to the present invention, there is also provided a communication system in which a third party encrypts communication data by using a public key of a certain person in an RSA scheme, and the person decrypts the communication data by using his/her secret key, in which the public key is a character string obtained by adding a character or a character string whose code is an odd number to the end of a character string which can specify the person.

In the electronic authentication system according to the present invention, a public key constituted by a character string which can be easily memorized by a third party. Therefore, the public key need not be electronically stored in an electronic file or the like, and the system can be simplified, and illegal authentication performed by falsifying the public key can be prevented from being established.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 is a flow chart showing the outline of the first embodiment of an electronic authentication system according to the present invention;

FIG. 3 is a flow chart showing a generation procedure for a key according to the present invention; and FIG. 4 is a flow chart showing another generation procedure for a key according to the present invention.

DESCRIPTION OF THE INVENTION

Figure 2:
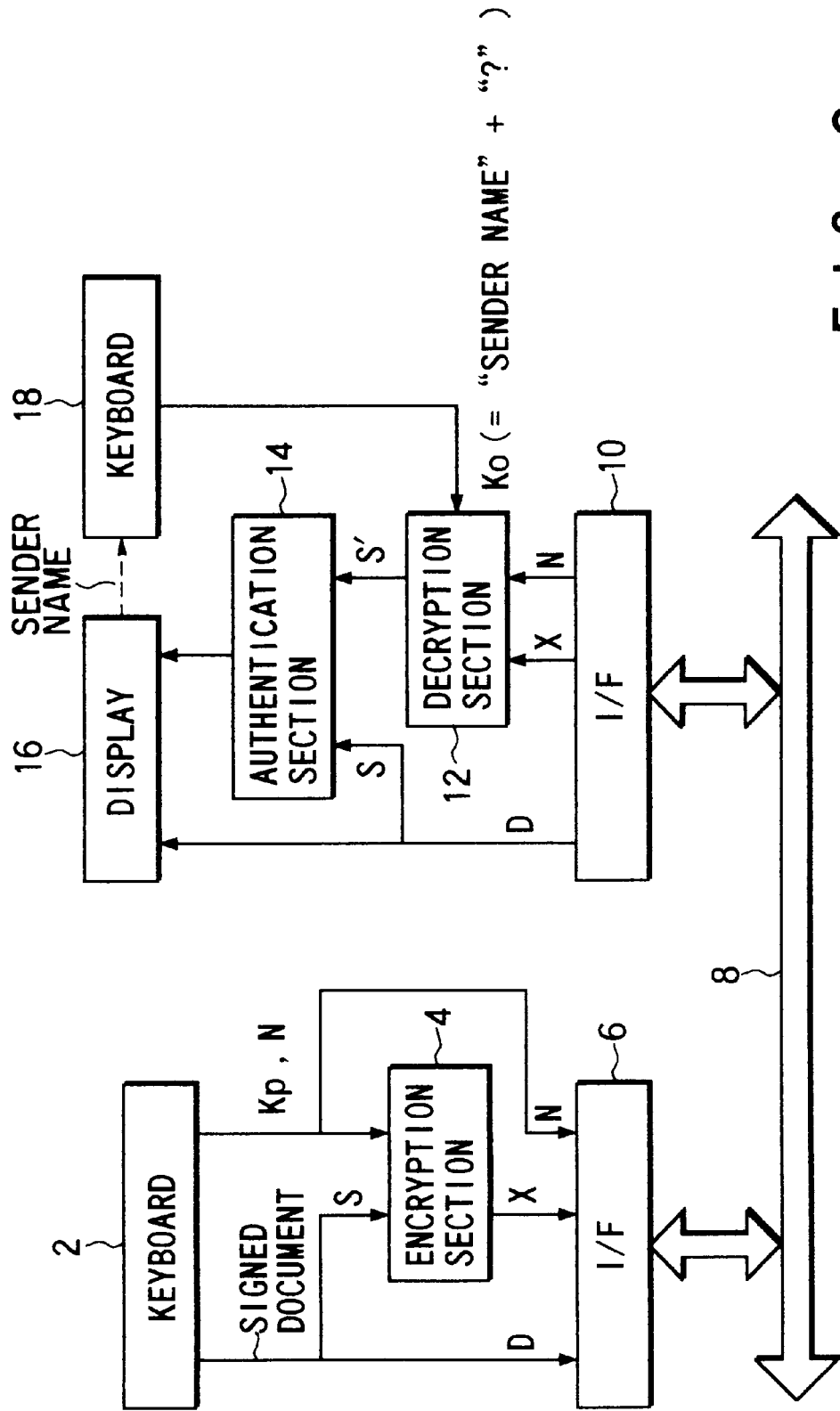
FIG. 2 is a view showing the arrangement of the electronic authentication system of the first embodiment.

A preferred embodiment of an electronic authentication system according to the present invention will now be described with reference to the accompanying drawings. The principle of electronic authentication according to the present invention will be described first with reference to FIG. 1. In this case, in order to make an explanation general, the following case will be described below. That is, a person forms document data, gives a signature to the document data and sends the document data with signature to a third party, and the third party checks whether the signature is a signature which is made by a true sender. As a matter of course, if value data representing an amount of money is used in place of document data, digital cash is realized.

A person (W XYZ) forms document data D. The document data also includes signature data S.

Only the signature data S is encrypted in an RSA scheme.

$$X = S^{Kp} \bmod N$$

In this case, Kp is a secret key of the sender, N is the product between large prime numbers p and q, and mod is a modulo operator (remainder calculation). The secret key Kp and the product N of the prime numbers are determined for each person by a system operator. The system operator secretly informs the person of his/her secret key Kp and the product N of the prime numbers. However, it is not necessary to secretly inform the person of the product N. The secret key is computed by a predetermined arithmetic operation from a public key which is determined for each person by the system operator. The prime numbers p and q are secret.

The document data D (plaintext also including signature data S), encrypted signature data X, and product N (plaintext) are sent to a third party (Mr. ABC) through a network.

The third party performs a decryption process as follows by using a public key Ko of the sender and sent N.

$$S' = X^{Ko} \bmod N$$

It is determined whether the decrypted signature data S' coincides with signature data S included in the document data D (plaintext). If the secret key corresponds to the public key (i.e., when encryption is performed by using a true secret key formed from the public key), the decrypted signature data S' necessarily coincides with the signature data S. If encryption is not performed by a true secret key of the sender, when decryption is performed by the public key of the sender, the decrypted signature data S' does not coincide with the signature data S. In this manner, the third party can authenticate that the signature of the sent data is performed by a true sender by comparing the decrypted signature data S' with the signature data S. The truth/falseness of the signature may be checked by another method.

The electronic authentication system of the present invention will be described below with reference to FIG. 2. The sender side is constituted by a keyboard 2, an RSA encryption section 4, and an interface 6, and the reception side is constituted by an interface 10, an RSA decryption section 12, an authentication section 14, a display 16, and a keyboard 18.

On the sender side, only the signature data S in the singed document D input from the keyboard 2 is input to the RSA encryption section 4, and the signature data S is RSA-encrypted by using the secret key Kp and the product N of large prime numbers p and q which are also input from the keyboard 2. The encrypted signature data X, product N (plaintext), and singed document data (also including signature data S) D (plaintext) are sent to a network 8. As described later, the system operator secretly informs the person of his/her secret key Kp and the product N of the prime numbers. However, it is not necessary to secretly inform the person of the product N.

In the reception side, of the encrypted signature data X, the product N, and the document data D which are received by the interface 10, the document data (plaintext) D is displayed by the display 16, and the signature data X and product N are supplied to the RSA decryption section 12. Signature data S' decrypted by the RSA decryption section 12 is supplied to the authentication section 14 and compared with the signature data S included in the document data D. The authentication result is displayed by the display 16. Unlike the prior art, the public key Ko required by the decryption section 12 is not obtained by searching the electronic file or the like, but the public key Ko is input from the keyboard 18. In this invention, the public key is a character string which can specify the name, address, E-mail address, and the like of the sender such that the public key is easily memorized by a third party, and which is/are included in the sent document data D. More specifically, since a character string which can be easily reasoned from the property of the sender is used as the public key Ko, an electronic storage device such as a dictionary file in which a public key is electronically stored is not required. The system operator determines which one of the name, the address, E-mail address, and the like is used, in advance.

Since the dictionary file is not required, contrary to the prior art, an electronic dictionary file cannot be counterfeited or falsified by a malicious hacker and a third party illegally cannot give signature data by using a pair of false secret key and false public key and send the signature data X. Therefore, illegal authentication cannot be established so that the security of cryptography using the RSA scheme can be improved. The system can be simplified since an electronic dictionary file is not required.

However, depending the case, the character string which is easily reasoned by a sender may not satisfy an essential condition, Code-value of public key must be an odd number, of the RSA scheme. For example, a case wherein a sender name is used will be described below. If the family name of the user is "Smith", the ASCII code string of "Smith" is "53 6D 69 74 68", and the code-value of the ASCII code string of "Smith" is an even number since the lowermost bit, i.e., that of "8" which is the end of the code string is an even number. Therefore, the ASCII code string "53 6D 69 74 68" cannot be directly used as a public key. In order to cope with this example, according to the present invention, a character string which can simply specify a sender name is not directly used as the public key Ko, but a character string obtained by adding a character or a character string whose code is an odd number to the end of a character string which specifies the sender name is used as the public key. The code-value of the code string of the character or character string to be added must be an odd number. In use of an ASCII code, when "!", "#", "%", "+", "–", "=", "?", or the like is additionally used, the above character string can be necessarily used as a public key for the RSA cryptography. The public key can be easily reasoned by a property of the sender, and the public key has a character string which can be easily memorized by a third party. A predetermined character or character string to be added is determined by a system operator. In this case, it is determined that "?" is added. More specifically, a third party finds a sender name from the document data D displayed by the display 16, and inputs a character string obtained by adding "?" to the sender name to the RSA decryption section 12 as the public key Ko.

Since senders having the same family and given names may be present, an E-mail address or the like plus the predetermined character or character string is preferably used as the public key Ko in place of a character string (ASCII code) obtained by adding a predetermined character or character string to a "sender name (although family and given names are preferably used, only a family name may be used)". It is assumed that the number of digits of the public key Ko is determined in advance. When the number of digits of the character string is smaller than the predetermined number of the digits, a proper character, e.g., "0" is preferably added to the end of the character string.

A secret key Kp will be described below. In this embodiment, a secret key Kp is formed from the public key Ko in the following manner. FIG. 3 is a flow chart showing a process of generating a secret key Kp performed by a system operator side.

In step S2, a sender determines his/her public key Ko (="OWN NAME" +"?") and inputs the public key Ko to the system.

Upon accept of the public key Ko from the sender, in step S4, large prime numbers p and q are generated.

In step S6, values N and ϕ(N) from the prime numbers p and q are computed.

$$N = p \times q$$

$$\phi(N) = (p-1) \times (q-1)$$

In step S8, it is determined by Euclidean algorithm whether the public key Ko and ϕ(N) are relatively prime. If No in step S8, the prime numbers p and q are altered in step S10 to change the values N and ϕ(N), and it is determined again whether the public key Ko and ϕ(N) are relatively prime. If Yes in step S8, the secret key Kp is computed by the following equation:

$$Kp = Ko^{-1} \bmod \phi(N)$$

In step S14, the system operator secretly informs a sender of the secret key Kp and the value N. However, it is not necessary to secretly inform the sender of the product N.

In this embodiment, to simplify calculation, the secret key Kp is generated by the equation in step S12.

However, the secret key Kp may be generated by the relationship represented by the following equation:

Ko×Kp) mod((p−1)×(q−1)÷gcd(p−1, p−1))=1 (where, gcd is the greatest common divisor of p−1 and q−1). The equation in step S12 is the sufficient condition of the above modified equation. Since the greatest common divisor is not computed in the equation in step S12, the secret key Kp can be easily generated by the equation in step S12.

In step S14, the system operator secretly informs a sender of the secret key Kp and the value N. However, it is not necessary to secretly inform the sender of the product N.

The generation procedure for a secret key Kp is not limited to the above description, the generation procedure may be modified as shown in FIG. 4. Steps S22 and S24 are the same as steps S2 and S4 in FIG. 3. In this procedure, it is determined in step S26 whether p−1 and the public key Ko are relatively prime. If No in step S26, the prime number p is altered in step S28, and step S26 is performed again. If Yes in step S26, it is determined in step S30 whether q−1 and the public key Ko are relatively prime. If No in step S30, q is altered in step S32, and step S30 is performed again. If Yes in step S30, since it is established that the public key Ko and $\phi(N)=(p-1)\times(q-1)$ are relatively prime, $N=p\times q$ and $\phi(N)=(p-1)\times(q-1)$ are computed in step S34, and the secret key $Kp=Ko^{-1} \bmod \phi(N)$ is computed in step S36.

In step S38, the system operator secretly informs a sender of the secret key Kp and the value N. However, it is not necessary to secretly inform the sender of the product N.

As described above, according to this embodiment, a character string which can be easily reasoned from a sender name, e.g., a character string obtained by adding a specific character of which code is an odd number, such as "?" to the end of the sender name or by adding a character string whose end character of which code is an odd number, is used as a public key. Therefore, when a third party decrypts signature data of a sender for authentication which is encrypted by using a secret key of the sender, the third party can know the public key of the sender without using an electronic dictionary file, and an electronic dictionary in which the public key is stored is not required. As a result, illegal authentication cannot be established by falsifying the public key in the electronic dictionary file, and the system is simplified.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, as a character string which can specify a sender, not only a sender name, but also items other than the items described above, and any item added with a character or a character string whose numerical value, i.e., code is an odd number may be used. As a character, an ASCII code is exemplified. However, another code such as an EBCDIC code or an ISO code may be used. Furthermore, the above description has been made with respect to an electronic authentication system in which a certain person adds a digital signature to communication data, and a third party authenticates the communication data with digital signature. The present invention can be also applied to a communication system in which a third party encrypts communication data in an RSA scheme by using a public key of a certain person and the certain person decrypts the communication data by using his/her secret key.

Authentication performed when data is sent through an on-line network has been described. However, the present invention can be also applied to a system in which a signature is given to data on a recording medium, and a third party authenticates the data with signature.

As has been described above, according to the present invention, there is provided an electronic authentication system which can prevent illegal authentication from being established.

I claim:

1. An electronic authentication method comprising the following steps of:
   encrypting plain signature data included in communication data by using a secret key of a sender in an RSA (Rivest-Shamir-Adleman) scheme to form encrypted signature data;
   sending the encrypted signature data together with the communication data including the plain signature data;
   decrypting the encrypted signature data by using a public key of the sender to form decrypted signature data, the public key being a character string obtained by adding a given character or a given character string to an end of a character string which specifies the sender, a code-value of a code string representing the given character or the given character string being an odd number; and
   comparing the decrypted signature data with the plain signature data included in the communication data to determine a truth/falseness of the plain signature data.

2. A method according to claim 1, wherein the public key is a character string obtained by adding the given character or the given character string to the end of a character string including at least one of a name, an address, and an E-mail address of the sender.

3. A method according to claim 1, wherein the secret key is calculated from the public key on the basis of the following equation:

$$Kp=Ko^{-1} \bmod((p-1)\times(q-1))$$

where Ko is the public key, Kp is the secret key, p and q are prime numbers, mod is a modulo operation, and p and q are determined such that Ko and $((p-1)\times(q-1))$ are relatively prime.

4. A method according to claim 3, wherein the public key is a character string obtained by adding the given character of the given character string to the end of a character string including at least one of a name, an address, and an E-mail address of the sender.

5. A method according to claim 1, wherein the secret key is calculated from the public key on the basis of the following equation:

$$(Ko\times Kp) \bmod((p-1)\times(q-1)\div\gcd(p-1, q1))=1$$

where, Ko is the public key, Kp is the secret key, p and q are prime numbers, mod is a modulo operation, gcd is the greatest common divisor, and p and q are determined such that Ko and $((p-1)\times(q-1))$ are relatively prime.

6. A method according to claim 5, wherein the public key is a character string obtained by adding the given character or the given character string to the end of a character string including at least one of a name, an address, and an E-mail address of the sender.

7. A communication method comprising the following steps of:
   encrypting communication data in an RSA scheme by using a public key of a receiver to whom the communication data is sent to form encrypted communication data, the public key being a character string obtained by adding a given character or a given character string to an end of a character string which specifies the receiver, a code-value of a least significant bit of a code string representing the given character or the given character string being an odd number;
   sending the encrypted communication data to the receiver; and
   decrypting the encrypted communication data by using a secret key of the receiver.

8. A method according to claim 7, wherein the public key is a character string obtained by adding the given character or the given character string to the end of a character string including at least one of a name, an address and an E-mail address of the receiver.

9. A method according to claim 7, wherein the secret key is calculated from the public key on the basis of the following equation:

$$Kp=Ko^{-1} \bmod((p-1)\times(q-1))$$

where Ko is the public key, Kp is the secret key, p and q are prime numbers, mod is a modulo operation, and p and q are determined such that Ko and $((p-1)\times(q-1))$ are relatively prime.

10. A method according to claim 9, wherein the public key is a character string obtained by adding the given character or the given character string to the end of a character string including at least one of a name, an address and an E-mail address of the receiver.

11. A method according to claim 7, wherein the secret key is calculated from the public key on the basis of the following equation:

$$(Ko \times Kp) \bmod ((p-1) \times (q-1) \div \gcd(p-1, q-1)) = 1$$

where, Ko is the public key, Kp is the secret key, p and q are prime numbers, mod is a modulo operation, gcd is the greatest common divisor, and p and q are determined such that Ko and $((p-1)\times(q-1))$ are relatively prime.

12. A method according to claim 11, wherein the public key is a character string obtained by adding the given character or the given character string to the end of a character string including at least one of a name, an address and an E-mail address of the receiver.

13. An electronic authentication apparatus comprising:
means for encrypting plain signature data included in communication data by using a secret key of a sender in an RSA (Rivest-Shamir-Adleman) scheme to form encrypted signature data;
means for sending the encrypted signature data together with the communication data including the plain signature data;
means for decrypting the encrypted signature data by using a public key of the sender to form decrypted signature data, the public key being a character string obtained by adding a given character or a given character string to an end of a character string which specifies the sender, a code-value of a least significant bit of a code string representing the given character or the given character string being an odd number; and
means for comparing the decrypted signature data with the plain signature data included in the communication data to determine a truth/falseness of the plain signature data.

14. An apparatus according to claim 13, wherein said decrypting means uses a public key which is a character string obtained by adding the given character or the given character string to the end of a character string including at least one of a name, an address, and an E-mail address of the sender.

15. An apparatus according to claim 13, wherein said encrypting means uses a secret key which is calculated from the public key on the basis of the following equation:

$$Kp = Ko^{-1} \bmod((p-1) \times (q-1))$$

where Ko is the public key, Kp is the secret key, p and q are prime numbers, mod is a modulo operation, and p and q are determined such that Ko and $((p-1)\times(q-1))$ are relatively prime.

16. An apparatus according to claim 15, wherein said decrypting means uses a public key which is a character string obtained by adding the given character or the given character string to the end of a character string including at least one of a name, an address, and an E-mail address of the sender.

17. An apparatus according to claim 13, wherein said encrypting means uses a secret key which is calculated from the public key on the basis of the following equation:

$$(Ko \times Kp) \bmod((p-1) \times (q-1) \div \gcd(p-1, p-1)) = 1$$

where, Ko is the public key, Kp is the secret key, p and q are prime numbers, mod is a modulo operation, gcd is the greatest common divisor, and p and q are determined such that Ko and $((p-1)\times(q-1))$ are relatively prime.

18. An apparatus according to claim 17, wherein said decrypting means uses a public key which is a character string obtained by adding the given character or the given character string to the end of a character string including at least one of a name, address, and E-mail address of the sender.

19. A communication apparatus comprising:
means for encrypting communication data in an RSA scheme by using a public key of a receiver to whom the communication data is sent to form encrypted communication data, the public key being a character string obtained by adding a given character or a given character string to an end of a character string which specifies the receivers, a code-value of a least significant bit of a code string representing a given character or the given character string being an odd number;
means for sending the encrypted communication data to the receiver; and
means for decrypting the encrypted communication data by the receiver.

20. An apparatus according to claim 19, wherein said encrypting means uses a public key which is a character string obtained by adding the given character or the given character string to the end of a character string including at least one of a name, an address, and an E-mail address of the receiver.

21. An apparatus according to claim 19, wherein said decrypting means uses a secret key which is calculated from the public key on the basis of the following equation:

$$Kp = Ko^{-1} \bmod((p-1) \times (q-1))$$

where Ko is the public key, Kp is the secret key, p and q are prime numbers, mod is a modulo operation, and p and q are determined such that Ko and $((p-1)\times(q-1))$ are relatively prime.

22. An apparatus according to claim 21, wherein said decrypting means uses a public key which is a character string obtained by adding the given character or the given character string to the end of a character string including at least one of a name, an address, and an E-mail address of the receiver.

23. An apparatus according to claim 19, wherein said encrypting means uses a secret key which is calculated from the public key on the basis of the following equation:

$$(Ko \times Kp) \bmod((p-1) \times (q-1) \div \gcd(p-1, q-1)) = 1$$

where, Ko is the public key, Kp is the secret key, p and q are prime numbers, mod is a modulo operation, gcd is the greatest common divisor, and p and q are determined such that Ko and $((p-1)\times(q-1))$ are relatively prime.

24. An apparatus according to claim 23, wherein said encrypting means uses a public key which is a character string obtained by adding the given character or the given character string to the end of a character string including at least one of a name, address, and E-mail address of the receiver.

* * * * *

UNITED STATES PATENT AND TRADEMARK OFFICE
CERTIFICATE OF CORRECTION

PATENT NO. : 5,987,133
DATED : November 16, 1999
INVENTOR(S) : K. Aisaka

It is certified that error appears in the above-indentified patent and that said Letters Patent is hereby corrected as shown below:

| COLUMN | LINE | | |
|---|---|---|---|
| 6 | 47 | "gcd($p$-1, $p$-1))" should read --gcd($p$-1, $q$-1))-- | |
| 8 (Claim 5, | 31 line 4) | "gcd($p$-1, $q$1))" should read --gcd($p$-1, $q$-1))-- | |
| 8 (Claim 5, | 33 line 5) | after "where" delete "," | |
| 9 (Claim 11, | 15 line 5) | after "where" delete "," | |
| 10 (Claim 17, | 1 line 4) | "gcd($p$-1, $p$-1))" should read --gcd($p$-1, $q$-1))-- | |
| 10 (Claim 17, | 3 line 5) | after "where" delete "," | |
| 10 (Claim 19, | 21 line 5) | "receivers," should read --receiver,-- | |

UNITED STATES PATENT AND TRADEMARK OFFICE
CERTIFICATE OF CORRECTION

PATENT NO. : 5,987,133
DATED : November 16, 1999
INVENTOR(S) : K. Aisaka

It is certified that error appears in the above-indentified patent and that said Letters Patent is hereby corrected as shown below:

COLUMN   LINE

10           55          after "where" delete ","
(Claim 23,   line 5)

Signed and Sealed this

Twentieth Day of March, 2001

Attest:

NICHOLAS P. GODICI

Attesting Officer    Acting Director of the United States Patent and Trademark Office